United States Patent
Mikulak et al.

(10) Patent No.: US 12,136,873 B2
(45) Date of Patent: Nov. 5, 2024

(54) SYSTEMS AND METHODS FOR ADAPTIVE POWER FACTOR CORRECTION

(71) Applicant: Safran Passenger Innovations, LLC, Brea, CA (US)

(72) Inventors: Steven Mikulak, Brea, CA (US); Randall Bird, Brea, CA (US); Austin Cotler, Brea, CA (US); Robert Langer, Brea, CA (US)

(73) Assignee: Safran Passenger Innovations, LLC, Brea, CA (US)

( * ) Notice: Subject to any disclaimer, the term of this patent is extended or adjusted under 35 U.S.C. 154(b) by 0 days.

(21) Appl. No.: 18/709,347

(22) PCT Filed: Dec. 16, 2021

(86) PCT No.: PCT/US2021/063731
§ 371 (c)(1),
(2) Date: May 10, 2024

(87) PCT Pub. No.: WO2023/113796
PCT Pub. Date: Jun. 22, 2023

(65) Prior Publication Data
US 2024/0333140 A1    Oct. 3, 2024

(51) Int. Cl.
*H02M 1/42* (2007.01)
*H02M 1/088* (2006.01)
*H02M 3/158* (2006.01)

(52) U.S. Cl.
CPC ......... *H02M 1/4225* (2013.01); *H02M 1/088* (2013.01); *H02M 3/158* (2013.01)

(58) Field of Classification Search
CPC ..... H02M 1/4225; H02M 1/088; H02M 3/158
See application file for complete search history.

(56) References Cited

U.S. PATENT DOCUMENTS

| | | |
|---|---|---|
| 4,074,344 A | 2/1978 | Pitel |
| 4,672,298 A | 6/1987 | Rohatyn |
| 8,872,484 B2 | 10/2014 | Kim |
| 9,667,139 B2 * | 5/2017 | Giuliano ............... H02M 3/158 |
| 10,027,120 B1 | 7/2018 | Zapata et al. |

(Continued)

FOREIGN PATENT DOCUMENTS

| | | |
|---|---|---|
| EP | 3210274 B1 | 12/2020 |
| WO | 2011091441 A1 | 7/2011 |

OTHER PUBLICATIONS

European Patent Office, International Search Report and Written Opinion, Aug. 11, 2022.

(Continued)

*Primary Examiner* — Rafael O De Leon Domenech
(74) *Attorney, Agent, or Firm* — Umberg Zipser LLP; Ryan Dean

(57) ABSTRACT

Systems and methods for adaptive power factor correction are described that utilize a circuit that senses a current or frequency of a line and controls one or more switches to vary the capacitance of the circuit based on the measured current or frequency. Two or more branches can be used to allow for the capacitance of the circuit to be varied over time in response to a change in the measured current or frequency. Using such systems and methods, a high power factor can be maintained even for higher line frequencies and lighter loads.

20 Claims, 2 Drawing Sheets

(56) References Cited

U.S. PATENT DOCUMENTS

| | | | |
|---|---|---|---|
| 2005/0017699 A1 | 1/2005 | Stanley | |
| 2014/0153306 A1* | 6/2014 | Pan | H02M 1/4225 |
| | | | 323/210 |
| 2015/0364988 A1 | 12/2015 | Lu et al. | |
| 2015/0364989 A1* | 12/2015 | Chung | H02M 1/12 |
| | | | 363/44 |
| 2023/0110761 A1* | 4/2023 | Qiu | H02M 1/4266 |
| | | | 363/13 |
| 2023/0111992 A1* | 4/2023 | Liu | H02M 1/10 |
| | | | 363/21.02 |

OTHER PUBLICATIONS

Louganski et al., "Active Compensation of the Input Filter Capacitor Current in Single-Phase PFC Boost Converters," proceedings on 2006 IEEE Compel Workshop, Jul. 16-19, 2006, pp. 282-288.

* cited by examiner

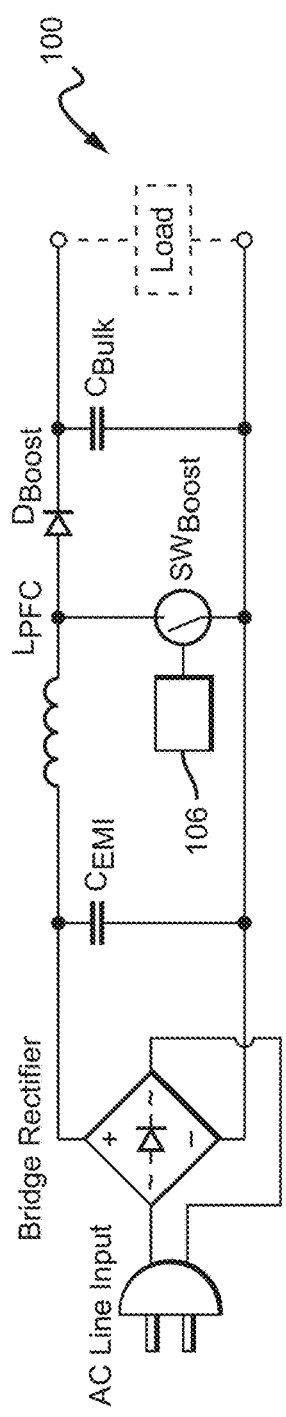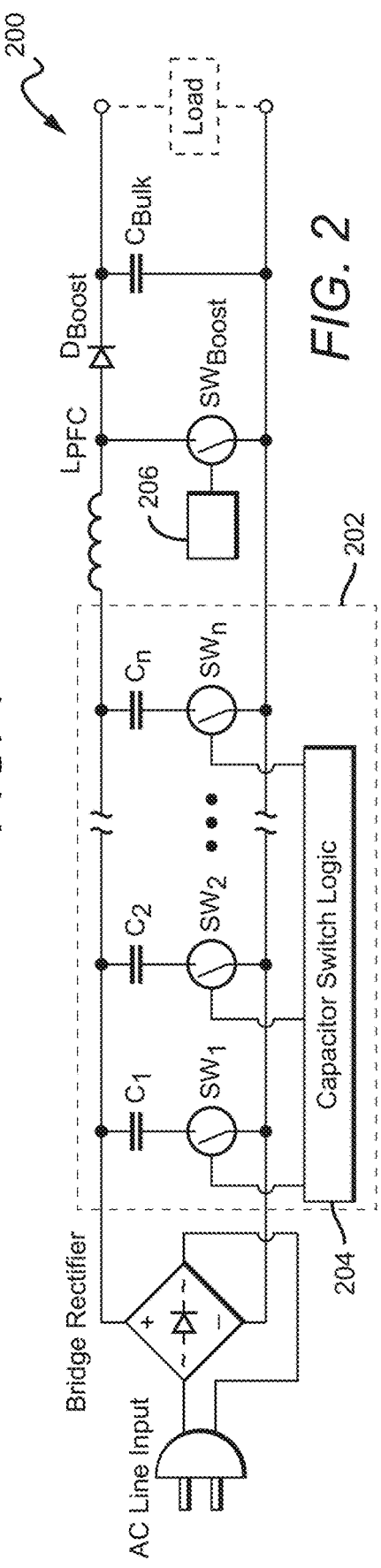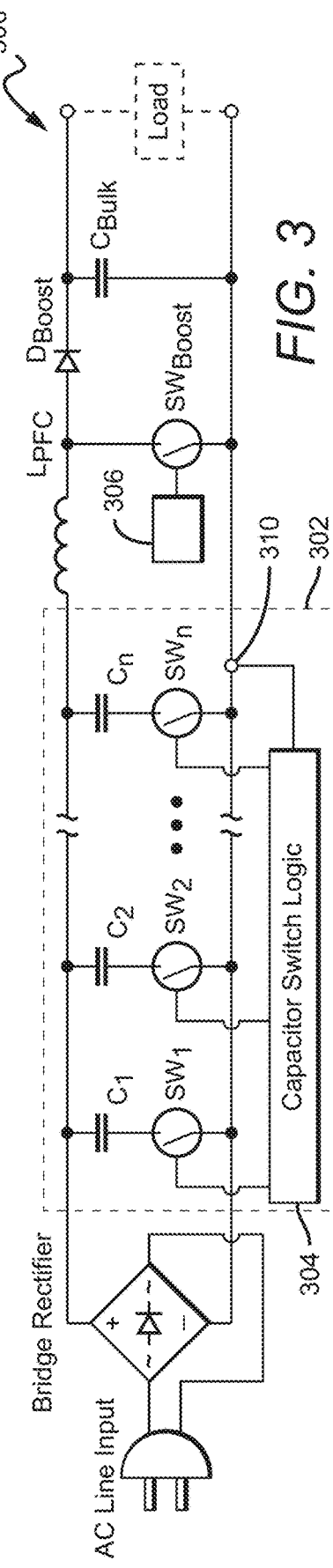
FIG. 1
FIG. 2
FIG. 3

SYSTEMS AND METHODS FOR ADAPTIVE POWER FACTOR CORRECTION

FIELD OF THE INVENTION

The field of the invention is power factor correction.

BACKGROUND

The following description includes information that may be useful in understanding the present invention. It is not an admission that any of the information provided herein is prior art or relevant to the presently claimed invention, or that any publication specifically or implicitly referenced is prior art.

Power factor is a dimensionless number used to describe the ratio of true power absorbed in Watts by a circuit to the apparent power measured in Volt Amps that the circuit demands. The driver of poor power factor is reactive elements in the circuit. For example, a purely resistive circuit has an ideal power factor of one. When the circuit is increasingly inductive, the power factor approaches zero and is considered to be "lagging" as the current waveform lags the voltage waveform. Highly capacitive loads will produce an opposite effect, also driving the power factor toward zero and are considered to be "leading". The closer the power factor is to one (i.e., unity), the less stress that is imposed on the power system.

As more and more devices are being added to electrical system, more of the energy used will require a higher power factor (e.g., closer to one). This is especially true on micro power systems such as households powered by solar panels or one or more generators, as well as aircraft, boats, or other vehicles where a majority of the total load on the power delivery system may be small passenger device chargers, for example, or devices with smaller individual power requirements (e.g., less than 75 W). The reason for this is that focus on maintaining high power factor is placed on high power devices. While lower power devices previously were not necessarily important to consider, as the population of low power devices increase on a power delivery system, the lower power devices collectively consume a larger percentage of overall power produced. It therefore becomes increasingly important to focus on light load power factor.

Manipulating reactance to improve power factor has been around for some time. For example, U.S. Pat. No. 4,672,298 describes tuning inductance and capacitance based on load to improve the power factor and thereby limit stress on the power system. This is known as passive power factor correction (PPFC). Using such methods, power factors of 0.7 were able to be achieved in large power systems.

It is also known to utilize active power factor correction (APFC) to increase the power factor of a circuit. See, e.g., U.S. Pat. No. 4,074,344. Instead of tuning power factor with inductors and capacitors directly on the alternating current (AC) lines, APFC uses a switch mode power supply to take rectified AC power and modulate the current flow through an inductor which shapes the input current waveform. This technique has been continually improved upon and often achieves power factors ranging from 0.9 to 0.99 when properly loaded.

On commercial passenger aircraft, there may be hundreds of passenger device chargers and other power supplies distributed throughout the cabin. Adding to this, aircraft typically operate at a higher line frequency of approximately 350 Hz-800 Hz, which further degrades the power factor. Mathematically this degradation is because in order to obtain voltage or current in an AC system, reactance is multiplied by frequency. With a total power demand consisting of many smaller loads, the AC power system may not achieve a desirable power factor. Recent regulations trend toward power factors of 0.98 leading or higher sometimes across a very wide range of load. It therefore is desirable to achieve a high power factor at each load in such circumstances even though many of the individual loads demand very low wattage.

In an APFC, a bypass capacitor is usually part of the design and limits conducted emissions. However, the bypass capacitor must be sufficient enough in size to handle a fully loaded power supply. Unfortunately, when the load is reduced from maximum, the impact of this capacitance to the overall reactance increases and the power factor decreases.

U.S. Pat. No. 8,872,484 and U.S. patent publication number 20150364988 discuss solutions to this problem by manipulating the control loop to compensate for the capacitance. While such solutions may be feasible if they are part of a digital solution or part of an integrated circuit, such solutions may otherwise be impractical as they generally require changes to the control loop and can add cost and complexity to the system.

Thus, there is still a need for a system that achieves near unity power factor correction in an AC power system from light to heavy load. Such a system should not require access to the control loop thus allowing for the use of low cost, low complexity, and high reliability parts.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

SUMMARY OF THE INVENTION

The inventive subject matter provides apparatus, systems, and methods for adaptive active power factor correction for an alternating current (AC) powered circuit, especially those where the power line frequency is between 350 Hz-800 Hz. The subject matter expands upon the APFC concept and is adaptive because it can optimize for circumstances where the load is smaller, frequency higher or the power factor is increasingly leading due to an input filter capacitance.

Preferred systems and methods alter the power factor of the circuit by varying the capacitance based on predetermined steps or thresholds. Thus, rather than compensate for the reactance such as in PPFC and other prior art systems, the inventive subject matter trades electromagnetic interference (EMI) noise for power factor by varying the amount of input capacitance present in the circuit. This is effective since the filter capacitor that is typically used only needs to be large in proportion to the load and because EMI is produced in proportion to the input current and therefore less filtering capacitance is required.

The inventive subject matter advantageously does not require modification of the control loop of the power supply to achieve a desired power factor under light load or high line frequency. In addition, in situations where the range of loads is vast such as a plurality of USB-based chargers that can be used to power anything from headphones to smart phones to laptops, the dynamic range of power output would otherwise present a challenge in meeting strict power factor requirements. The inventive subject matter, however, can adapt the capacitance of the circuit to address this challenge and meet the power factor requirements.

Such systems may be beneficial for use in aircraft or other vehicles where the load is smaller or the line frequency is higher but is contemplated for use in other environments such as where solar power or generator power is used, for example.

Because the inventive subject matter does not require access to the control loop, it is contemplated that the inventive subject matter could permit the use of COTS PFC controllers that may not have otherwise been designed for a high power factor for light load or high line frequency.

Various objects, features, aspects, and advantages of the inventive subject matter will become more apparent from the following detailed description of preferred embodiments, along with the accompanying drawing figures in which like numerals represent like components.

BRIEF DESCRIPTION OF THE DRAWINGS

FIG. 1 illustrates a diagram of a prior art system for an active power factor correction utilizing a boost converter circuit.

FIG. 2 illustrates a diagram of one embodiment of an adaptive power factor correction system.

FIG. 3 illustrates a diagram of another embodiment of an adaptive power factor correction system.

DETAILED DESCRIPTION

Figure 5:
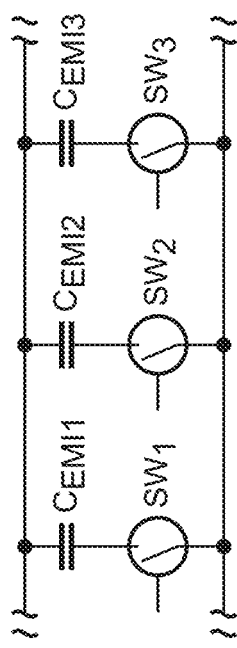
FIG. 5 illustrates a diagram of another embodiment of an adaptive power factor correction unit.

Where references are made regarding servers, services, controllers, interfaces, portals, platforms, or other systems formed from computing devices, it should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The following discussion provides many example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

FIG. 1 illustrates a prior art system 100 for an active power factor correction utilizing a boost converter circuit. An AC line input is fed into a bridge rectifier to convert the AC input into a direct-current (DC) output.

The boost converter circuit comprises an on-state when the $SW_{Boost}$ is closed, and an off-state when the $SW_{Boost}$ is opened. When in the on-state, current flows through the inductor $L_{PFC}$ and the inductor $L_{PFC}$ stores some energy by generating a magnetic field. When in the off-state, the impedance is increased thereby reducing current. This also reduces energy of the magnetic field created in the on-state to maintain the current towards load.

Typically, the switch $SW_{Boost}$ is cycled quickly using an active PFC control 106 and operates at a frequency many times faster than the AC line frequency resulting in current entering $L_{PFC}$ shaped much like the AC voltage waveform. Current stored in the inductor $L_{PFC}$ flows through diode $D_{Boost}$ and produces voltage on capacitor $C_{Bulk}$ for use by a load. Capacitor $C_{EMI}$ can filter the switching noise of the switch $SW_{Boost}$, and under normal conditions contributes an insignificant reactance to the circuit 100. However, in lightly loaded and high line frequency conditions, this filtering capacitor $C_{EMI}$ will cause the power factor to lead.

FIG. 2 illustrates one embodiment of an AC circuit 200 having an adaptive power factor correction (APFC) unit 202. The AC circuit 200 may have a line frequency of between 350 Hz-800 Hz, for example. The APFC unit 202 replaces the filtering capacitor $C_{EMI}$ of system 100 with one or more, and preferably two or more, switched capacitors $C_1, C_2 \ldots C_n$. Preferably, each of the switched capacitors $C_1, C_2 \ldots C_n$ is disposed on a distinct branch of the circuit 200 with each branch comprising a switch serially connected with one of the capacitors.

For example, the APFC unit 202 may comprise a first branch that includes a first switch $SW_1$ serially connected with a first capacitor $C_1$. The APFC unit 202 can further comprise a second branch that includes a second switch $SW_2$ serially connected with a second capacitor $C_2$. It is contemplated that in addition to the first and second branches, the circuit 200 may comprise additional branches that each includes a switch serially connected with one of the capacitors. The optional, additional branches are shown by the ellipse and represented by the nth branch that comprises switch $SW_n$ serially connected with a capacitor $C_n$.

In some embodiments, the branches may be electrically coupled to the circuit 200 at one end between an output of a bridge rectifier and an inductor $L_{PFC}$ of the circuit 200. Of course, rather than a bridge rectifier, the power supply technology to permit components to be coupled to the AC power line could alternatively utilize a buck APFC, a bridgeless APFC, and any other commercially suitable power converters.

Preferably, a sensor is configured to measure a current of the circuit 200, such as described below in reference to FIG. 3. Using a preprogramed logic, such as described further below, a controller 204 receives a feedback signal (i.e., an output) from the sensor and causes one or more of the switches $SW_1, SW_2 \ldots SW_n$ to open or close. In this manner, the total capacitance of the circuit 200 can be increased or decreased based on predetermined steps or thresholds as a function of a measured load of the circuit 200 to thereby alter the power factor of the circuit 200.

In addition to that described above, it is contemplated that the various switched capacitors of the APFC unit may be switched open and closed in different combinations to adjust a total capacitance of the circuit.

As one example shown in FIG. 5, the APFC unit 202 of FIG. 2, for example, could comprise three switched EMI capacitors $C_{EMI1}, C_{EMI2}, C_{EMI3}$. As shown, each of the capacitors $C_{EMI1}, C_{EMI2}, C_{EMI3}$ may be disposed on a separate branch. A first branch can include a first switch $SW_1$ serially connected with a first capacitor $C_{EMI1}$. A second branch can include a second switch $SW_2$ serially connected with a second capacitor $C_{EMI2}$. A third branch can include a third switch $SW_3$ serially connected with a third capacitor $C_{EMI3}$.

As shown in Table 1 below, eight combinations of parallel capacitance can be realized by utilizing these three branches of switched capacitors, which thereby permits seven different steps from a baseline capacitance where the switches $SW_1$, $SW_2$, $SW_3$ are each open. In the Table below, the open switches are shown as "0" and the closed switches are shown as "1".

TABLE 1

| $C_{Total}$ | $SW_1$ | $SW_2$ | $SW_3$ |
|---|---|---|---|
| 0 | 0 | 0 | 0 |
| $C_{EMI3}$ | 0 | 0 | 1 |
| $C_{EMI2}$ | 0 | 1 | 0 |
| $C_{EMI2} + C_{EMI3}$ | 0 | 1 | 1 |
| $C_{EMI1}$ | 1 | 0 | 0 |
| $C_{EMI1} + C_{EMI3}$ | 1 | 0 | 1 |
| $C_{EMI1} + C_{EMI2}$ | 1 | 1 | 0 |
| $C_{EMI1} + C_{EMI2} + C_{EMI3}$ | 1 | 1 | 1 |

Figure 6:
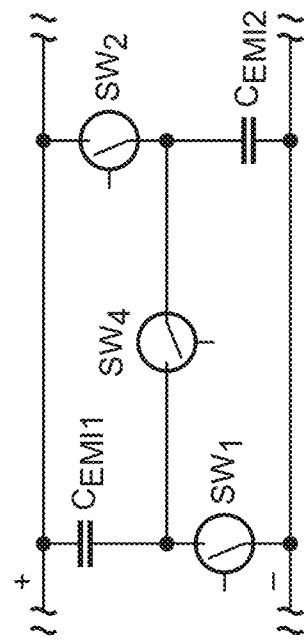
FIG. 6 illustrates a diagram of another embodiment of an adaptive power factor correction unit.

As another example shown in FIG. 6, the APFC unit 202 of FIG. 2, for example, could instead comprise a first branch that includes a first switch $SW_1$ serially connected with a first capacitor $C_{EMI1}$ and a second branch that includes a second switch $SW_2$ serially connected with a second capacitor $C_{EMI2}$. Rather than the four combinations of capacitance allowed by the two individual branches, an additional switch $SW_4$ can be disposed between the first and second branches to increase the total number of combinations.

The additional switch advantageously can provide for six combinations of parallel capacitance as set forth in Table 2 below by utilizing various series and parallel combinations of the capacitors $C_{EMI1}$, $C_{EMI2}$. In the Table below, the open switches are shown as "0" and the closed switches are shown as "1".

TABLE 2

| $C_{Total}$ | $SW_1$ | $SW_2$ | $SW_4$ |
|---|---|---|---|
| 0 | 0 | 0 | 0 |
| $C_{EMI2}$ | 0 | 0 | 1 |
| $(1/C_{EMI1} + 1/C_{EMI2})^{-1}$ | 0 | 1 | 0 |
| $C_{EMI2}$ | 0 | 1 | 1 |
| $C_{EMI1}$ | 1 | 0 | 0 |
| $C_{EMI1} + C_{EMI2}$ | 1 | 0 | 1 |
| $C_{EMI1}$ | 1 | 1 | 0 |
| Short + to − | 1 | 1 | 1 |

Of course, different combinations of the above could also be used to arrive at the desired number of predetermined steps or thresholds necessary to alter the power factor of the circuit for the contemplated load.

Exemplary controllers discussed herein could comprise a simple comparator circuit to monitor the current and control the switches to apply the appropriate capacitance at predetermined load steps. In other embodiments, the controller could also comprise an analog to digital converter (ADC) to monitor the load and/or frequency such that more complex logic or software processing may be incorporated in switching the capacitance.

In some embodiments, the controller 204 is configured to receive the sensor output and cause the first switch $SW_1$ to (i) close if the current of the circuit 200 is greater than a first threshold and (ii) open if the current of the circuit 200 is less than or equal to the first threshold. The controller 204 is further configured to cause the second switch $SW_2$ to (i) close if the current of the circuit 200 is greater than a second threshold and (ii) open if the current of the circuit 200 is less than or equal to the second threshold, where the first threshold is less than the second threshold.

In other embodiments, it is contemplated that the controller 204 is further configured to open or close each of the first and second switches $SW_1$, $SW_2$ as a function of the current of the circuit 200 to thereby vary a total capacitance of the circuit 200. Thus, for example, as shown in Table 1, by opening or closing one or more of the switches $SW_1$, $SW_2$ .... $SW_n$, the total capacitance of the circuit 200 can be adjusted to a set number of values, which is defined by the total number of permutations which may be based on the number of switches and branches of the APFC unit 202. Of course, where a variable capacitor is used, the range of capacitance may be further increased.

In such embodiments, the first capacitor $C_1$ may have a capacitance that is less than the capacitance of the second capacitor $C_2$. Of course, it is also contemplated that the first capacitor $C_1$ may have a capacitance that is greater than the capacitance of the second capacitor $C_2$. Even where the capacitance of the first and second capacitors $C_1$, $C_2$ are equal, using the system shown in FIG. 2, the total capacitance of the circuit 200 can be increased or decreased by opening or closing one or more of the switches $SW_1$, $SW_2$ .... $SW_n$.

In still other embodiments, it is contemplated that one or more of the capacitors $C_1$, $C_2$ .... $C_n$ comprise a variable capacitance, such as using a mechanically variable capacitance or an electronically controlled capacitance.

In some embodiments, the APFC unit 202 comprises the controller 204, although it is contemplated that the controller 204 could be separate from the APFC unit 202.

Using the APFC unit 202, the circuit 200 advantageously can utilize the variable capacitance of the circuit 200 to maintain a very high power factor (i.e., 0.98 leading or greater) over a wide range of loads. In this manner, rather than balance capacitance to inductance as had been done in prior art solutions, the bypass capacitance of the circuit 200 is varied or tuned in the APFC unit 202 to optimize conducted emission and harmonic noise to power factor.

With respect to the remaining numerals and labels in FIG. 2, the same considerations for like components with like numerals and labels of FIG. 1 apply.

FIG. 3 illustrates another embodiment of an AC circuit 300 having an adaptive power factor correction (APFC) unit 302. As discussed above, the APFC unit 302 replaces the filtering capacitor $C_{EMI}$ of system 100 with one or more, and preferably two or more, switched capacitors $C_1$, $C_2$ .... $C_n$. Preferably, each of the switched capacitors $C_1$, $C_2$ .... $C_n$ is disposed on a distinct branch of the circuit 300 with each branch comprising a switch serially connected with one or more capacitors.

For example, the APFC unit 302 may comprise a first branch that includes a first switch $SW_1$ serially connected with a first capacitor $C_1$. The APFC unit 302 can further comprise a second branch that includes a second switch $SW_2$ serially connected with a second capacitor $C_2$. It is contemplated that in addition to the first and second branches, the circuit 300 may comprise additional branches that each includes a switch serially connected with one of the capacitors. The optional, additional branches are shown by the ellipse and represented by the nth branch that comprises switch $SW_n$ serially connected with a capacitor $C_n$.

Preferably, a sensor 310 is electrically coupled to the circuit 300 and configured to measure a current of the circuit 300 and generate a sensor output. Using a preprogramed logic, such as described further below, a controller 204 receives a feedback signal (i.e., an output) from the sensor 310 and causes one or more of the switches $SW_1$, $SW_2 \ldots SW_n$ to open or close. In this manner, the total capacitance of the circuit 300 can be increased or decreased based on a measured load of the circuit 300.

Although FIG. 3 illustrates an exemplary manner in which current in the circuit can be monitored such as by using the current sense circuit (sensor 310), the location of the current sensor is not limited to just this implementation and may be measured by any number of other ways to measure the approximate load of the circuit. For example, current may be instead measured at one or more of, or at each of, the capacitors, at an input or output to the bridge rectifier, and so forth. Additionally, or alternatively, it is contemplated that the line frequency could be measured/monitored to determine how much capacitance to apply to the circuit.

Preferably, the controller 304 is configured to receive the sensor output and cause the first switch $SW_1$ to (i) close if the current of the circuit 300 is greater than a first threshold and (ii) open if the current of the circuit 300 is less than or equal to the first threshold. The controller 304 is further configured to cause the second switch $SW_2$ to (i) close if the current of the circuit 300 is greater than a second threshold and (ii) open if the current of the circuit 300 is less than or equal to the second threshold, where the first threshold is less than the second threshold.

In such embodiments, the first capacitor $C_1$ may have a capacitance that is less than the capacitance of the second capacitor $C_2$. However, even where the capacitance of the first and second capacitors $C_1$, $C_2$ are equal, using the system shown in FIG. 3, the total capacitance of the circuit 300 can be increased or decreased by opening or closing one or more of the switches $SW_1$, $SW_2 \ldots SW_n$.

In some embodiments, the APFC unit 302 comprises the controller 304, although it is contemplated that the controller 304 could be separate from the APFC unit 302.

Using the APFC unit 302, the circuit 300 advantageously can utilize the variable capacitance of the circuit 300 to maintain a very high power factor (i.e., 0.98 leading or greater) over a wide range of loads. In this manner, rather than balance capacitance to inductance as had been done in prior art solutions, the bypass capacitance of the circuit 300 is varied or tuned in the APFC unit 302 to optimize conducted emission and harmonic noise to power factor. With respect to the remaining numerals and labels in FIG. 3, the same considerations for like components with like numerals and labels of FIG. 1 apply.

Figure 4:
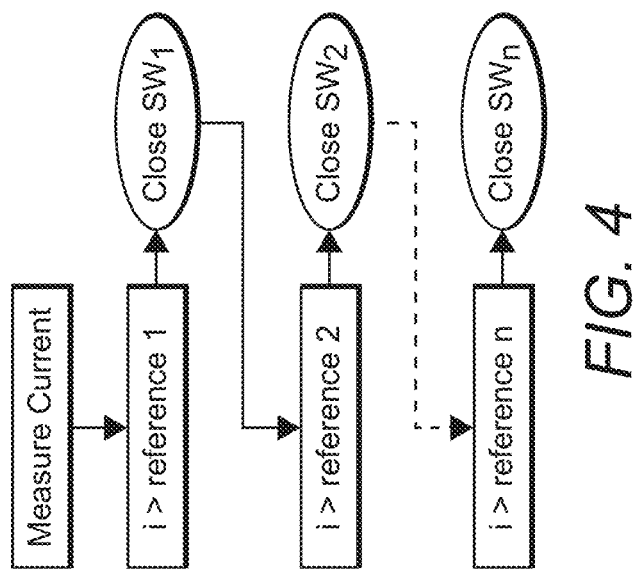
FIG. 4 illustrates a flowchart of a method for varying a capacitance of a circuit.

FIG. 4 illustrates a stepped approach for varying the capacitance of a circuit. The current (i) of the circuit can be measured and compared with a first reference value. If the measured current (i) is greater than the first reference value, a first switch can be closed thereby increasing the total capacitance of the circuit. The measured current (i) can then be compared with a second reference value. If the measured current (i) is greater than the second reference value, a second switch can be closed further increasing the total capacitance of the circuit. The measured current (i) can then be compared with a third reference value. If the measured current (i) is greater than the third reference value, a third switch can be closed still further increasing the total capacitance of the circuit. And so forth until the measured current (i) does not equal the next reference value or there or no other values for comparison.

This approach can be reversed to reduce the capacitance when not needed. For example, a measured current (i) can be compared against the last switch to be closed. If the measured current (i) is less than or equal to the reference value for that branch, that switch can be opened thereby reducing the total capacitance of the circuit.

In another aspect, methods for correcting a power factor of an AC powered circuit are also contemplated. In such methods, an active power factor correction (APFC) unit can be connected to the circuit between an output of a bridge rectifier and an inductor. A current of the circuit can be measured using a sensor, for example, and the measured current value can be compared with one or more reference values.

If the measured current is greater than a first reference value of the one or more reference values, a first switch of the APFC device can be closed. Preferably, the first switch is electrically coupled in series with a first capacitor, such that closing of the first switch increases the overall capacitance of the circuit.

If the measured current is greater than a second reference value of the one or more reference values, a second switch of the APFC device can be closed. In such embodiments, it is contemplated that the second reference value is greater than the first reference value. Preferably, the second switch is electrically coupled in series with a second capacitor, such that closing of the second switch increases the overall capacitance of the circuit. The first capacitor may have a first capacitance and the second capacitor has a second capacitance that is greater than the first capacitance.

Similarly, where applicable, a third switch of the APFC device can be closed if the measured current is greater than a third reference value of the one or more reference values, where the third reference value is greater than the second reference value. Preferably, the third switch is electrically coupled in series with a third capacitor, such that closing of the third switch increases the overall capacitance of the circuit.

In this manner, using the measured value of the current from the sensor, a feedback signal from the sensor can be used to control the first and second switches.

It is further contemplated that the second switch of the APFC device can be opened if the measured current is less than or equal to the second reference value. Similarly, the first switch of the APFC device can be opened if the measured current is less than or equal to the first reference value.

Using the systems and methods described herein, a power factor of the AC circuit can be maintained at 0.98 leading or higher, for example, even with varying loads and/or frequencies of the circuit.

The inventive subject matter achieves a higher power factor over a wider range of loads and frequencies than other active power factor designs that do not account for the EMI capacitor. As opposed to control loop solutions, the inventive subject matter does not require software or complex analog design and allows for the use of low-cost COTS controllers as an option. Such controllers are feature rich, proven, and have the added benefit of quick development cycles but are typically not otherwise suited to produce high power factor at high line frequency or light load.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value with a range is incorporated into the specification as if it were individually recited herein. All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. An adaptive power factor correction system for an alternating current (AC) powered circuit, comprising:
    a sensor electrically coupled to the circuit and configured to measure a current of the circuit and generate a sensor output;
    an active power factor correction (APFC) unit comprising a set of branches including:
        a first branch comprising a first switch serially connected with a first capacitor;
        a second branch comprising a second serially connected with a second capacitor; and
    a controller configured to receive the sensor output and cause the first switch to (i) close if the current of the circuit is greater than a first threshold and (ii) open if the current of the circuit is less than or equal to the first threshold.

2. The system of claim 1, wherein the set of branches are connected to the circuit at one end between an output of a bridge rectifier and an inductor of the circuit.

3. The system of claim 1, wherein the controller is further configured to cause the second switch to (i) close if the current of the circuit is greater than a second threshold and (ii) open if the current of the circuit is less than or equal to the second threshold, optionally wherein the first threshold is less than the second threshold.

4. The system of claim 1, wherein the controller is further configured to open or close each of the first and second switches as a function of the current of the circuit to thereby vary a total capacitance of the circuit.

5. The system of claim 1, wherein the APFC unit comprises the controller.

6. The system of claim 1, wherein the controller comprises a comparator circuit that receives the sensor output and causes the first switch to open or close.

7. The system of claim 1, wherein the first capacitor comprises a variable capacitance.

8. The system of claim 1, further comprising a third switch disposed between and electrically coupled with the first and second branches, and wherein the controller is further configured to receive the sensor output and cause the third switch to (i) close if the current of the circuit is greater than a third threshold and (ii) open if the current of the circuit is less than or equal to the third threshold.

9. The system of claim 1, wherein a power factor of the circuit is maintained at 0.95 leading or greater.

10. The system of claim 1, wherein a line frequency of the circuit is between 350 Hz to 800 Hz.

11. The system of claim 1, wherein the set of branches comprises a third branch comprising a third switch serially connected with a third capacitor, and wherein the controller is configured to open or close each of the first switch, the second switch and the third switch as a function of the current of the circuit to thereby vary a total capacitance of the circuit.

12. A method for correcting a power factor of an alternating current (AC) powered circuit, comprising:
    connecting an active power factor correction (APFC) unit between an output of a bridge rectifier and an inductor;
    measuring a current of the circuit;
    comparing the measured current with one or more reference values;

closing a first switch of the APFC device if the measured current is greater than a first reference value of the one or more reference values, wherein the first switch is electrically coupled in series with a first capacitor; and closing a second switch of the APFC device if the measured current is greater than a second reference value of the one or more reference values, wherein the second reference value is greater than the first reference value, and wherein the second switch is electrically coupled in series with a second capacitor.

13. The method of claim 12, wherein a sensor measures the current of the circuit, and wherein a feedback signal from the sensor is used to control the first and second switches.

14. The method of claim 12, further comprising:
closing a third switch of the APFC device if the measured current is greater than a third reference value of the one or more reference values, wherein the third reference value is greater than the second reference value.

15. The method of claim 14, wherein the third switch is electrically coupled in series with the first and second capacitors, optionally wherein the third switch is electrically coupled in series with a third capacitor.

16. The method of claim 12, further comprising:
opening the second switch of the APFC device if the measured current is less than or equal to the second reference value; and
opening the first switch of the APFC device if the measured current is less than or equal to the first reference value.

17. The method of claim 12, wherein the APFC unit is configured to measure the current, compared the measured current with the one or more reference values, and close the first switch or the second switch.

18. The method of claim 12, wherein the first capacitor comprises a variable capacitance.

19. The method of claim 12, wherein a power factor of the circuit is maintained at 0.95 leading or greater.

20. The method of claim 12, wherein a line frequency of the circuit is between 350 Hz-800 Hz.

* * * * *